Patented Apr. 18, 1939

2,154,626

UNITED STATES PATENT OFFICE 2,154,626

PRODUCTION OF PURE BENZOIC ACID

Wilhelm Koch, Ludwigshafen-on-the-Rhine, Germany, assignor to I. G. Farbenindustrie Aktiengesellschaft, Frankfort - on - the - Main, Germany, a corporation of Germany No Drawing. Application February 25, 1929, Serial No. 342,680. In Germany March 5, 1928

8 Claims. (Cl. 260—525)

The present invention relates to the production of pure benzoic acid.

In the course of the last years a process has been suggested for making benzoic acid catalytically from phthalic acid or phthalic anhydride and it has also been recommended to combine this process with the production of phthalic anhydride by the catalytic oxidation of naphthalene in the vapor phase. The benzoic acid obtained by these processes is as a rule not sufficiently pure to be put on the market directly and it is therefore essential to subject the crude product to a simple purification process.

According to my present invention the purification of the crude benzoic acid is effected by treating it with a reducing agent, converting any phthalic anhydride present into a readily soluble compound, such as phthalic acid or readily soluble salts, and removing the impurities by leaching with water or aqueous solutions. By the said treatment with a reducing agent any naphthoquinones that may be present in the crude benzoic acid, are converted into readily soluble naphthohydroquinones.

The process according to my invention may be carried out by making the crude benzoic acid, which has previously been brought into a state as finely divided as possible, so that its particles have a diameter of, for example, 0.01 to 0.02 millimeter, into a paste with water and treating that paste while stirring with sodium bisulphite or gaseous sulphur dioxide; whereby the naphthoquinones are converted into the corresponding naphthohydroquinones and any phthalic anhydride present is converted into phthalic acid. By filtering the mass by suction, the aqueous solution which contains the impurities is removed, and practically pure benzoic acid is left on the filter. If necessary, the said operation may be repeatedly applied.

Another way of carrying out my invention, and one which I prefer to apply, consists in its essential steps in converting the crude benzoic acid into a melt or dissolving it in an inert organic solvent which is not miscible with water, and subjecting this melt or solution to the action of a reducing agent, whereupon an aqueous solution or suspension of an agent capable of combining with acids is applied to the mass in such an amount that any phthalic acid present is bound thereby. In case the crude benzoic acid is free from naphthoquinone, the treatment with a reducing agent may even be dispensed with. Suitable agents capable of combining with acids are, for example, the oxides or hydroxides of the alkali or alkaline earth metals or the alkali metal salts of weak acids, such as the carbonates, bicarbonates and the like. It has been found to be particularly advantageous to employ salts of such acids as are set free from their aqueous solutions by the phthalic acid under the conditions of working, but not by the substantially weaker benzoic acid. A typical example of such salts is sodium bisulphite. When working with such salts it is possible to employ an excess of the agent capable of combining with acids, without any substantial quantities of benzoic acid being dissolved thereby. The advantage is obtained that all impurities present, that is both, naphthoquinones as well as phthalic anhydride, are removed in a single operation. The employment of sodium bisulphite has the further advantage that an addition of a special reducing agent can be dispensed with.

When working up the benzoic acid purified according to the present invention into alkali metal benzoate, it may in some cases be advisable to subject it, after dissolving at a low temperature in a solution of alkali metal carbonate or bicarbonate, to an after-treatment first with decolorizing carbon and then with an alkali metal permanganate; in this way an entirely white alkali metal benzoate is obtained.

The following examples will further illustrate the nature of the present invention, but the invention is not restricted thereto. The parts are by weight.

*Example 1*

200 parts of crude benzoic acid containing, for example, 90 per cent of benzoic acid, 5.6 per cent of phthalic acid, 3.2 per cent of naphthoquinone and 1.2 per cent of other impurities of unknown nature, are finely ground, made into a paste with 600 parts of water at a temperature of about 40 to 50° C., whereupon 30 parts of sodium bisulphite are added and the whole is stirred for 3 to 4 hours. Thereupon the mass is cooled to room temperature (about 15 to 20° C.) and filtered by suction. After washing twice with water the benzoic acid is sufficiently pure for further use or treatment. On drying a product containing 99 per cent of benzoic acid, and in which no naphthoquinone and phthalic acid can be detected, is obtained.

In order to convert this benzoic acid for example into sodium benzoate, 100 parts of the acid are dissolved in 400 parts of water and 69 parts of sodium bicarbonate; the solution is filtered, if necessary, and then heated with 2 to 4 parts of decolorizing carbon. After filtering off the carbon, the solution is treated with 1 to 2 parts of potassium permanganate. The sodium benzoate recovered from the filtrate by evaporation is free from any objectionable color.

*Example 2*

200 parts of crude benzoic acid having the composition indicated in Example 1 are finely ground, made into a paste with 600 parts of water and thereupon stirred with 10 parts of a finely powdered magnesium aluminium alloy, known in the trade as "Electron metal", and from 1 to 2 parts of glacial acetic acid. After stirring for 2 to 3 hours the mass is filtered by suction and the operation is repeated with the addition of further 3 to 5 parts of the said alloy. After again filtering by suction the product is washed with water. The resulting benzoic acid is about 98 per cent pure, and phthalic acid and naphthoquinone can no longer be detected therein.

*Example 3*

100 parts of crude benzoic acid are dissolved in the warm in 450 parts of xylene. Any undissolved residue is removed by decantation and the solution is stirred at about 90° C. with about 150 to 180 parts of water and about 30 to 50 parts of a sodium bisulphite solution of 40° Baumé strength. The amount of sodium bisulphite added depends on the quantity of the impurities present in the benzoic acid. After stirring for about 1 hour the two layers, which form on stopping the stirrer, are separated while still hot. Benzoic acid which is sufficiently pure for use can be recovered from the xylene solution by one of the usual methods, for example, by crystallization or by evaporation of the solvent or by extraction with an alkaline solution.

From the aqueous solution a small amount of crystallized pure benzoic acid is separated on cooling, while the phthalic acid remains in the solution in the form of the acid sodium phthalate from which it can be recovered by the addition of mineral acid.

*Example 4*

50 parts of crude benzoic acid are dissolved at room temperature in 900 parts of xylene, whereupon any undissolved residue is removed by decantation and the solution is stirred without heating with about 125 parts of water and about 25 parts of sodium bisulphite solution of 40° Baumé strength. After about 1 hour the bisulphite solution which contains the dissolved naphthohydroquinones is removed and the xylene solution is stirred for about 1 hour at about 90° C. with about 120 parts of water and 2.1 parts of caustic soda solution of 40° Baumé strength, which corresponds to a content of the benzoic acid in phthalic anhydride of 5.2 per cent. Thereupon the mass is allowed to cool while stirring. The xylene solution yields a benzoic acid which is sufficiently pure for further use.

*Example 5*

100 parts of benzoic acid containing 10 per cent of phthalic anhydride are melted under a layer of 300 parts of water and 8 parts of caustic soda solution of 40° Baumé strength. Thereupon the mass is stirred for about 1 hour at 95 to 100° C. and is then allowed to cool while stirring. The benzoic acid separates in a well crystallized state and can be separated from the liquid by filtration by suction. From the mother liquor the phthalic acid can be recovered by precipitation by mineral acids.

*Example 6*

500 parts of benzoic acid containing about 11 per cent of phthalic anhydride and about 8 per cent of naphthoquinone are stirred at room temperature for 2 hours in an autoclave with 1000 parts of water, 250 parts of sodium bisulphite solution of 40° Baumé strength and 38 parts of caustic soda solution of 40° Baumé strength. The mass is then heated while stirring and the temperature kept for 2 hours at 100° C., whereby a pressure of about 1 to 2 atmospheres is established. The mass is then allowed to cool slowly while stirring. The benzoic acid which has been separated can be recovered by filtration by suction and washing with water. The dissolved phthalic acid can be recovered from the mother liquor by acidification with mineral acids.

It is to be understood that in the process according to the present invention it may sometimes be advisable or even necessary to recrystallize the pure benzoic acid with an addition of active carbon so as to obtain a particularly pure and snow-white product.

What I claim is:

1. The process for the production of pure benzoic acid which comprises acting on crude benzoic acid obtained from phthalic anhydride with a reducing agent and a small amount of water which is sufficient to dissolve any reduced naphthoquinone, phthalic acid and phthalic anhydride present, thereby hydrating the phthalic anhydride, and separating the solution from the benzoic acid.

2. The process for the production of pure benzoic acid which comprises converting crude benzoic acid obtained from phthalic anhydride into a substantially non-aqueous liquid state, treating the same with a reducing agent and then with an aqueous solution of an agent capable of combining with acids in an amount sufficient to bind the phthalic acid formed, and separating the benzoic acid from the solution.

3. The process for the production of pure benzoic acid which comprises dissolving crude benzoic acid obtained from phthalic anhydride in an inert organic solvent not miscible with water, treating the solution with a reducing agent and with an aqueous solution of an agent capable of combining with acids in an amount sufficient to bind the phthalic acid formed and separating the benzoic acid from the solution.

4. The process for the production of pure benzoic acid which comprises dissolving crude benzoic acid obtained from phthalic anhydride in xylene, treating the solution with a reducing agent and with an aqueous solution of an agent capable of combining with acids in an amount sufficient to bind the phthalic acid formed and separating the benzoic acid from the solution.

5. The process for the production of pure benzoic acid which comprises dissolving crude benzoic acid obtained from phthalic anhydride in an inert organic solvent not miscible with water, treating the same with an aqueous solution of sodium bisulphite in an amount sufficient to reduce the naphthoquinone present and to bind the phthalic acid formed, and separating the benzoic acid from the solution.

6. The process for the production of pure benzoic acid which comprises converting crude benzoic acid obtained from phthalic anhydride into a melt, treating the melt in the presence of water with a reducing agent and with an aqueous solution of an agent capable of combining with acids in an amount sufficient to bind the phthalic acid formed and separating the benzoic acid from the solution.

7. The process for the production of benzoic acid which comprises melting crude benzoic acid obtained from phthalic anhydride under water, treating the melt with an aqueous solution of a reducing agent and with an aqueous solution of an agent capable of combining with acids in an amount sufficient to bind the phthalic acid formed and separating the benzoic acid from the solution.

8. The process for the production of pure benzoic acid which comprises melting crude benzoic acid obtained from phthalic anhydride under water, treating the melt with an aqueous solution of sodium bisulphite in an amount sufficient to reduce the naphthoquinone present and to bind the phthalic acid formed, and separating the benzoic acid from the solution.

WILHELM KOCH.